United States Patent
Langguth

(10) Patent No.: US 6,830,291 B2
(45) Date of Patent: Dec. 14, 2004

(54) GUIDE RAIL FOR A DRIVER

(75) Inventor: Martin Langguth, Krailling, DE (US)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/429,253

(22) Filed: May 5, 2003

(65) Prior Publication Data

US 2003/0227196 A1 Dec. 11, 2003

(30) Foreign Application Priority Data

May 3, 2002 (DE) .......................................... 102 19 965

(51) Int. Cl.[7] .............................................. B60J 7/057
(52) U.S. Cl. ..................... 296/216.08; 296/223; 384/42
(58) Field of Search ........................... 296/216.08, 223; 384/26, 42

(56) References Cited

U.S. PATENT DOCUMENTS 4,175,784 A   11/1979  Schatzler et al.
4,293,161 A   10/1981  Lutz
5,228,743 A  * 7/1993  Regner ........................ 296/223
5,344,209 A  * 9/1994  Regner ........................ 296/223

FOREIGN PATENT DOCUMENTS

DE  1 108 578       6/1961
DE  28 56 015      10/1981
DE  44 22 646 C1    8/1995
FR  2 771 970 A1    6/1999
GB  2 327 644 A     2/1999

* cited by examiner

Primary Examiner—Dennis H. Pedder
(74) Attorney, Agent, or Firm—Nixon Peabody LLP; David S. Safran

(57) ABSTRACT

A guide rail (2) for a driver (4) which can be driven and which is coupled to a vehicle component, especially a sliding roof cover, with a guide channel (8) for holding an elongated, axially movable drive element (19) and with a guide (7) for movably supporting the driver (4) which is connected to the drive element (19), the guide channel (8) fitting around the drive element (19) and being formed of surrounding parts that alternate in the axial direction on different sides, on one of the sides the respective surrounding parts being interrupted so as to form a continuous slot (14) in which a connecting part (18) which connects the drive element (19) to the driver (4) is movably held.

18 Claims, 6 Drawing Sheets

GUIDE RAIL FOR A DRIVER

BACKGROUND OF THE INVENTION

1. Field of the Invention

The invention relates to a guide rail for a driver which can be driven and which is coupled to a movable vehicle component, especially a sliding roof cover.

2. Description of Related Art

German Patent DE 44 22 646 C1 discloses a frame for motor vehicle roofs on which a cover for the roof opening is movably supported. The cover can be moved by means of a drive cable which is guided in a guide channel which is formed on the frame. The guide channel is formed such that it surrounds the drive cable in its axial direction alternately on different sides. The cover is supported via sliding blocks on separate guide rails which are made or mounted on the frame so that it can be moved selectively between the closed and the open position. These separate guide rails are disclosed, for example, in published German Patent Application DE 28 56 015 A1 and counterpart U.S. Pat. No. 4,293,161.

SUMMARY OF THE INVENTION

The primary object of the present invention is to provide the initially mentioned guide rail with improved functionality and simplified production as well as to devise a frame with such a guide rail.

The object is achieved by a guide rail for a driver which can be driven and which is coupled to a movable vehicle component, especially a sliding roof cover, with a guide channel for holding an elongated, axially movable drive element and with a guide for movable support of the driver which is connected to the drive element, the guide channel fitting around the drive element alternating in its axial direction on different sides, on one of the sides, the respective surrounding part being interrupted by a continuous slot, and a connecting part which connects the drive element to the driver being movably held in the slot.

The guide rail with the guide channel can be produced with a simple, two-part mold tool, for example, for injection molding without undercuts. By the shaping of the continuous slot, the drive element or drive cable can be connected to the driver so that, on the guide for the drive element or the drive cable, a guide for the driver, which can generally be a slider or a carriage, can be integrated in a compact arrangement. The guide rail can also be integrated later in one piece on the frame of, for example, a sliding roof, or it is mounted later on such a frame.

The object is also achieved by the frame of a motor vehicle roof, with a movable roof part for closing or clearing a roof opening, especially a sliding roof frame, with at least one guide rail, in which the frame is either an injection molding made of plastic or a die casting made of metal.

Embodiments of the guide rail are explained in detail below with reference to the drawings.

DETAILED DESCRIPTION OF THE INVENTION

Figure 1:
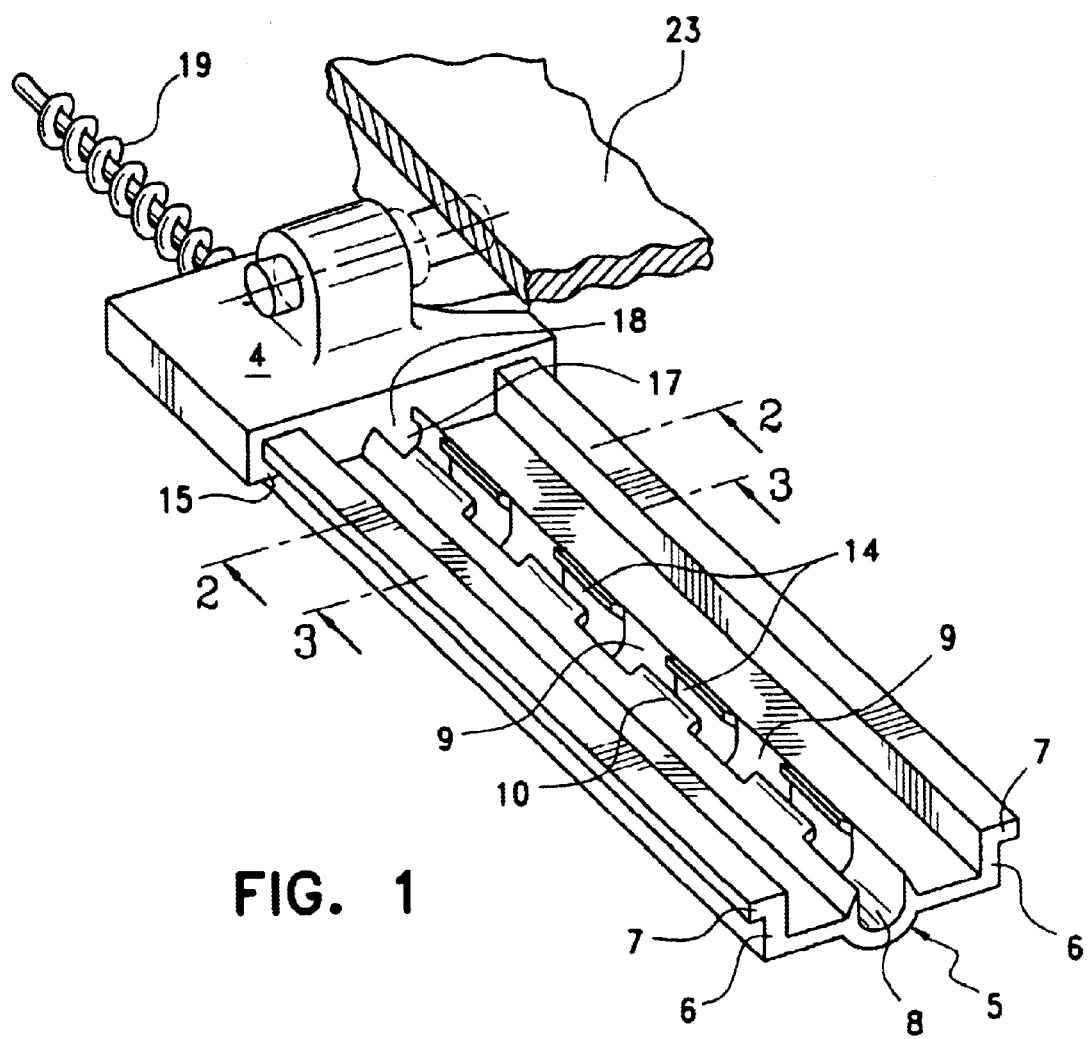
FIG. 1 is a perspective view from above of a guide rail with a driver which is movably supported on it.
Figure 2:
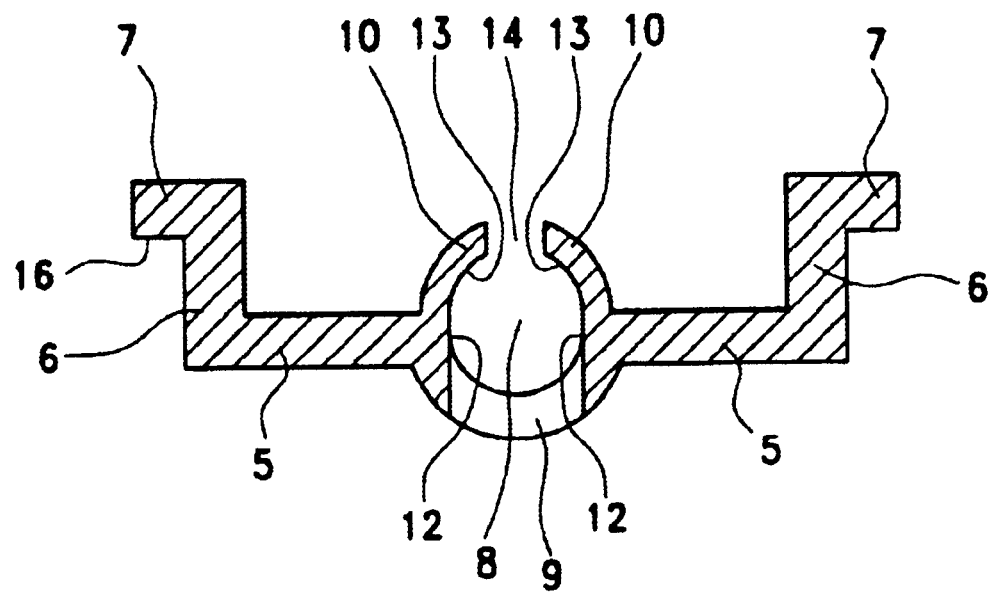
FIG. 2 is a cross-sectional view of the guide rail taken along line 2—2 in FIG. 1, and FIGS. 7 & 8 are corresponding views, but FIG. 7 showing a plastic frame attached to and formed as part of the guide rail, respectively and FIG. 8 showing a piece frame and guide.
Figure 3:
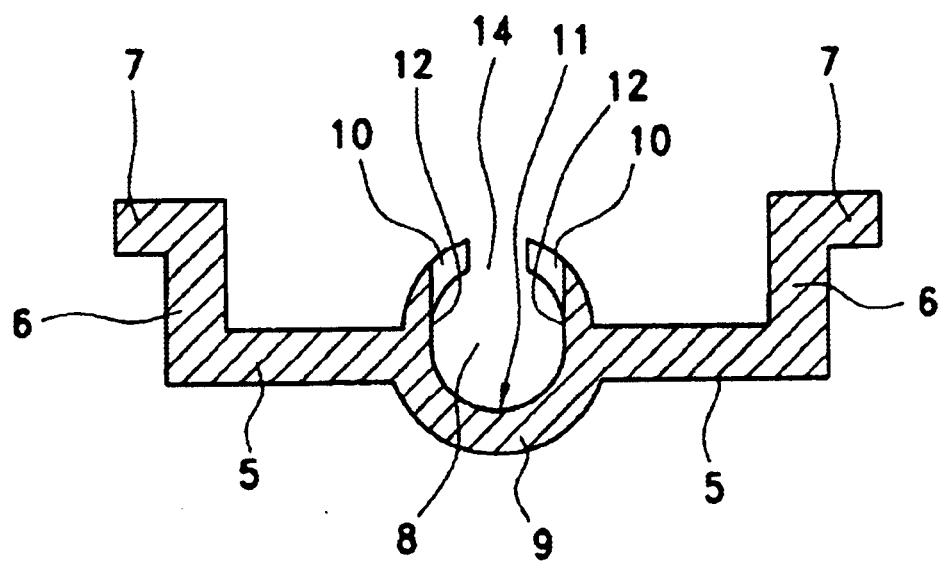
FIG. 3 is a cross-sectional view of the guide rail taken along line 3—3 in FIG. 1.

A guide rail 1 (see FIGS. 1 to 3), which is, for example, part of a frame 2 of a sliding roof unit 3 for a motor vehicle (see FIG. 6) and is formed, for example, as a plastic injection molding or a metal die casting, and especially as an aluminum die casting, and on which a driver 4 is movably supported, contains a central section 5 with legs 6 which are molded onto both sides. The legs 6 project upward from the central section 5, for example, at a right angle, and have leg ends 7 which are directed outward from the middle section 5 and give the legs an inverted L-shape.

Along the guide rail 1, in the middle of the central section 5, a guide channel 8 is formed by alternating first and second wall parts 9, 10 of the central section 5. The first wall parts 9 surround the guide channel 8 (see FIG. 3) on its bottom 11 and two opposing sides 12 while leaving the top 13 open, and the second wall parts 10 surround the guide channel 8 (see FIG. 2) on the two opposing sides 12 while leaving it open on the bottom 11. However, the top 13 of the second wall parts 10 do not fully close the top of the guide channel 8, since the tops are interrupted by an open slot 14. Accordingly, the guide rail 1 is shaped such that it can be produced by a split mold tool with two mold halves without undercuts.

The driver 4 is made such that it can be moved along the guide rail 1, but is held in the transverse direction and to the top on the guide rail 1. To do this, the driver 4 fits around, for example, each of the two leg ends 7 with a respective holding section 15 which is supported on the lower support surface 16 of the leg ends 7. The holding section 15 can be formed in one piece, or in the installation of the driver 4 on the guide rail 1, if it is seated, for example, from overhead on the guide rail 1, can be mounted later. The contour of the bottom of the driver 4 can be matched to the contour of the guide rail 1 such that more guiding or sliding surfaces are formed than the number which is necessary for clear guidance of the driver 4. The driver 4 can also be supported on the guide rail 1 by means of roller bearings. This guide is thus merely exemplary and can also be formed by guideways and guide surfaces which are formed differently on the guide rail 1.

Furthermore, the driver 4 contains a connecting part 17 which is connected by means of a bridge 18 to the driver 4. The connecting part is held in the guide channel 8 such that, when the driver 4 which is mounted on the guide rail 1 moves, the bridge 18 is moved through the respective slot. On the connecting part 17, a conventional drive cable 19 for a sliding roof cover is mounted which likewise extends through the guide channel.

Figure 4:
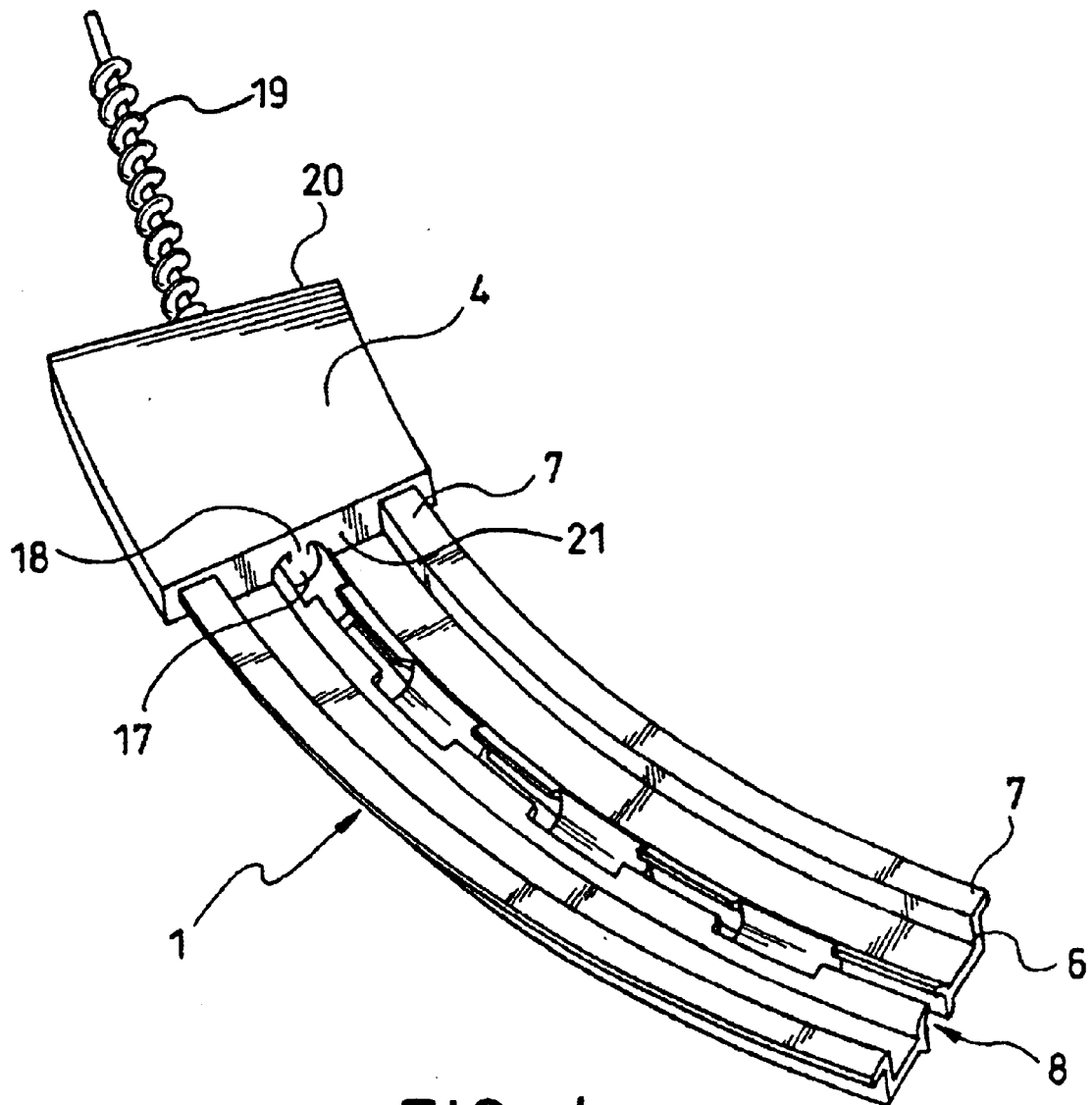
FIG. 4 is a perspective view from above of an embodiment of the guide rail which runs curved sideways in the plane of movement of the driver.

The embodiment of the guide rail 1 shown in FIG. 4 is formed with a uniform curvature in the plane of the guide rail 1. The driver 4 accordingly has curved guide surfaces. The driver 4 can also be made so short in the direction of motion that it can also follow the curvatures of the guide rail 1 with nonuniform radii of curvature and different directions of curvature. For guidance in the transverse direction on the guide rail 1, the driver 4, for example, in the direction of motion, has guide sections which are short in the area of its front side 20 and its rear side 21. Between the two guide sections, then, there can be room for guide curvature of varied extent.

Figure 5:
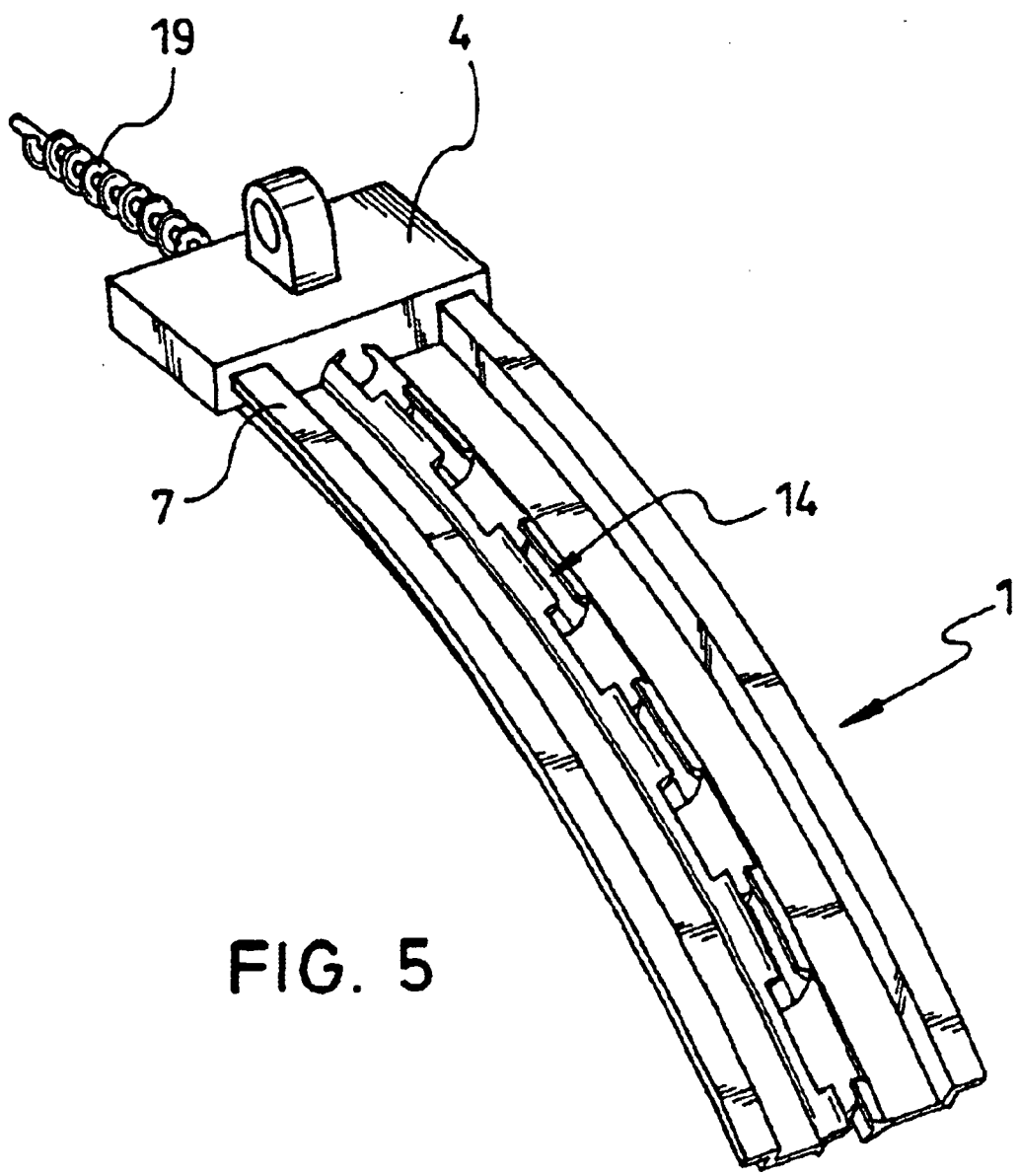
FIG. 5 is a perspective view from above of an embodiment of the guide rail which runs curved downward in the direction of movement of the driver.

According to another embodiment, the guide rail 1, in the lengthwise direction, can have at least a curvature up and/or down (see FIG. 5) so that concave and/or convex paths can be produced. This curvature up or down can also be combined with a lateral curvature as shown in FIG. 4 (not shown).

Figure 6:
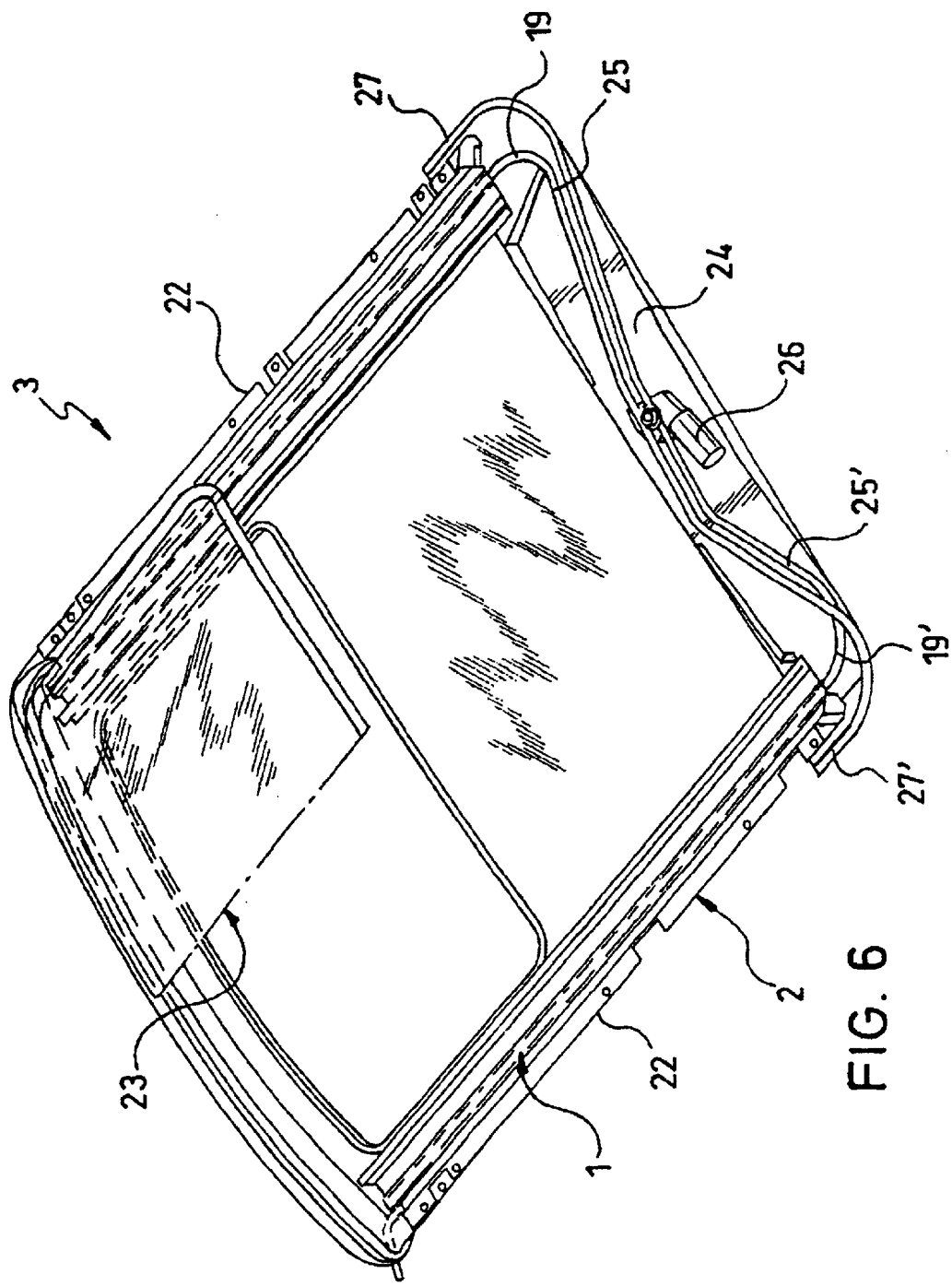
FIG. 6 is a perspective view from above of a sliding roof unit for a motor vehicle roof which contains at least one guide rail in accordance with the invention.
Figure 7:
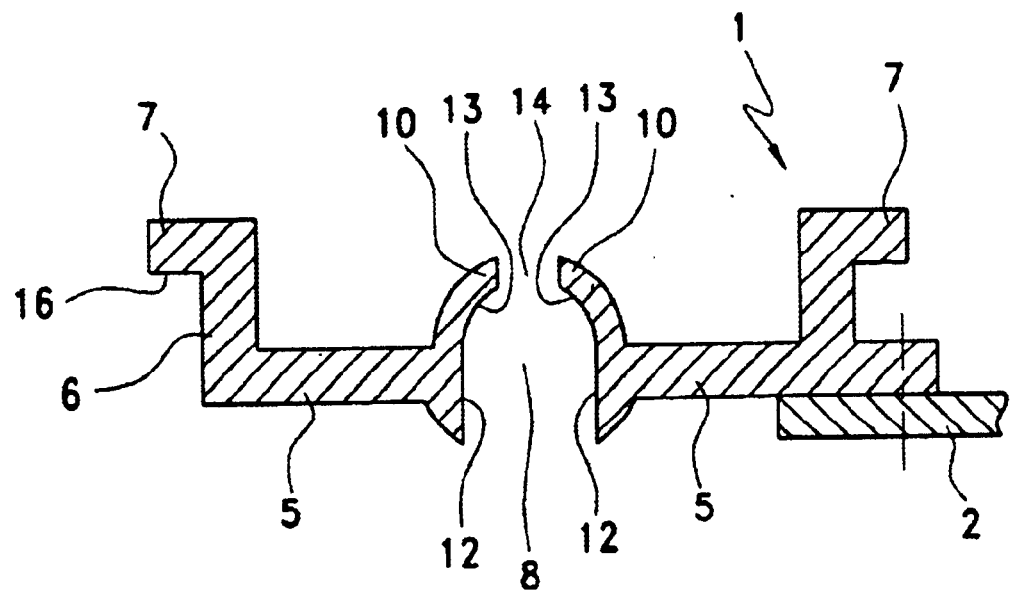
Figure 8:
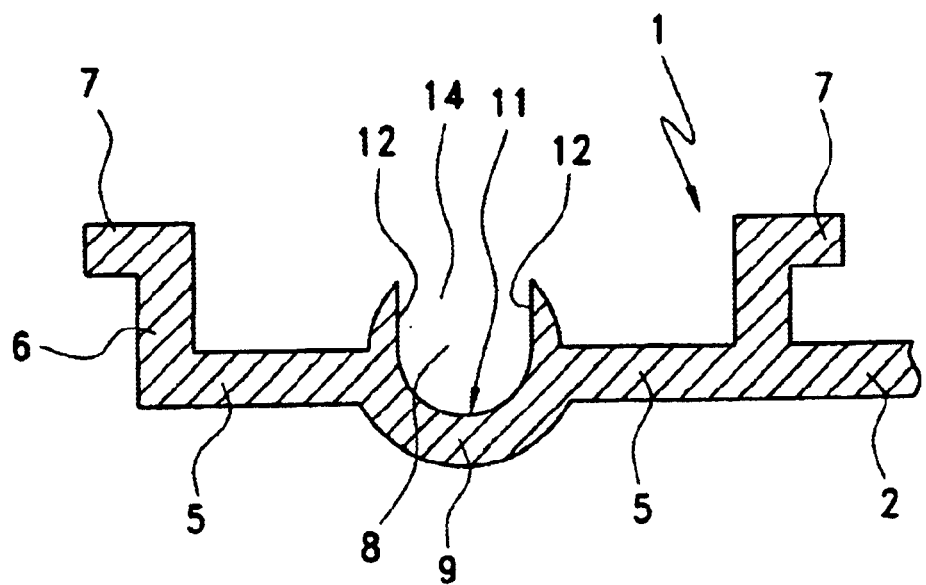

The sliding roof unit 3 shown in FIG. 6, on each of its two opposing lengthwise sides 22, contains one such guide rail 1 with a driver which is supported on it (not shown in FIG. 6) and on which a sliding roof cover 23 (only its right half is shown schematically) is movably supported via the respective connecting elements. The sliding roof unit 3 has a rear transverse part 24 which is produced in one piece in a plastic injection mold and which contains the cable channels 25, 25' for the right drive cable 19 and the left drive cable 19', a drive motor 26 and the run-out channels 27, 27' for the two free ends of the drive cables 19, 19'. These cable channels are formed in the same way as the described guide channel 8, but do not require a slot 14 if a driver 4 is not guided at the same time on it.

Mounting of the drive cable 19 can easily take place in this guide rail such that the driver 4 pulls the drive cable 19 though the guide channel 8. In the prior art, conversely, the drive cable is inserted through its guide channels, in which special care must be taken to prevent the danger of kinking of the cable.

The guide rail with the driver is suited for driving a host of movable motor vehicle parts such as hatches, locks, cabriolet roofs or covers of sliding roofs and sliding and lifting roofs.

What is claimed is:

1. Guide rail for a driver which is drivable and which is coupled to a movable vehicle component, said guide rail comprising a guide channel for holding an elongated, axially movable drive element and with a guide for movably supporting the driver is connected to the drive element, the guide channel having surrounding parts which fit around the drive element alternating in an axial direction on different sides thereof, one of the sides of the respective surrounding parts being interrupted so as to form a continuous slot, and a connecting part which connects the drive element to the driver being movably held in the slot.

2. Guide rail as claimed in claim 1, wherein the slot is formed on a side of the guide rail facing the driver.

3. Guide rail as claimed in claim 1, wherein the surrounding parts are made in the shape of a circular arc and the slot is formed essentially symmetrically in the middle of the guide channel for the drive element.

4. Guide rail as claimed in claim 3, wherein the guide channel for the drive element is formed in the middle of the guide rail.

5. Guide rail as claimed in claim 1, wherein the guide rail is straight at least in sections.

6. Guide rail as claimed in claim 1, wherein the guide rail is curved in at least one of up, down and sideways lengthwise directions.

7. Guide rail as claimed in claim 1, wherein the drive element is a threaded cable.

8. Guide rail as claimed in claim 1, wherein the driver is a sliding element which is coupled to a sliding roof mechanism.

9. Guide rail as claimed in claim 1, wherein the guide rail is one of a die cast and an injection molded part.

10. Guide rail as claimed in claim 9, wherein the guide rail is a die casting made of metal.

11. Frame of a motor vehicle roof with a movable roof part for closing and at least partially clearing a roof opening of a motor vehicle and having at least one guide rail, said at least one guide rail comprising a guide channel for holding an elongated, axially movable drive element and with a guide for movably supporting the driver is connected to the drive element, the guide channel having surrounding parts which fit around the drive element alternating in an axial direction on different sides thereof, one of the sides of the respective surrounding parts being interrupted so as to form a continuous slot, and a connecting part which connects the drive element to the driver being movably held in the slot.

12. Frame as claimed in claim 11, wherein the flame is a plastic injection molding and the guide rails are metal die castings attached thereto.

13. Frame as claimed in claim 11, wherein the guide rails are in one piece with the frame formed as an injection molded part.

14. Guide rail as claimed in claim 11, wherein the slot is formed on a side of the guide rail facing the driver.

15. Guide rail as claimed in claim 11, wherein the surrounding parts are made in the shape of a circular arc and the slot is formed essentially symmetrically in the middle of the guide channel for the drive element.

16. Guide rail as claimed in claim 15, wherein the guide channel for the drive element is formed in the middle of the guide rail.

17. Guide rail as claimed in claim 11, wherein the guide rail is straight at least in sections.

18. Guide rail as claimed in claim 11, wherein the guide rail is curved in at least one of up, down and sideways lengthwise directions.

* * * * *